United States Patent [19]

Kahn et al.

[11] 4,405,993
[45] Sep. 20, 1983

[54] LIQUID CRYSTAL DISC MEMORY SYSTEM

[75] Inventors: Frederic J. Kahn; Henryk Birecki, both of Palo Alto; Robert A. Burmeister, Jr., Saratoga, all of Calif.

[73] Assignee: Hewlett-Packard Company, Palo Alto, Calif.

[21] Appl. No.: 221,880

[22] Filed: Jan. 2, 1981

[51] Int. Cl.³ .......................... G11B 7/00; G11B 7/24
[52] U.S. Cl. .................................... 365/108; 369/109; 369/275; 369/284; 369/288
[58] Field of Search ................ 365/108; 369/109, 275, 369/284, 288

[56] References Cited

U.S. PATENT DOCUMENTS

| | | | |
|---|---|---|---|
| 3,592,526 | 7/1971 | Dreyer | 350/352 |
| 3,657,928 | 4/1972 | Melamed | 350/330 |
| 3,768,886 | 10/1973 | Sharpless | 350/330 |
| 3,796,999 | 3/1974 | Kahn | 340/173 |
| 4,037,929 | 7/1977 | Brkot et al. | 350/347 V |
| 4,190,330 | 2/1980 | Berreman | 350/347 R |
| 4,279,152 | 7/1981 | Crossland | 350/350 S |

OTHER PUBLICATIONS

IEEE Spectrum, Feb. 1979, pp. 33-38, "An Optical Disk Replaces 25 Mag Tapes", Kenney et al.
IEEE Spectrum, Aug. 1978, pp. 20, 22, 24, 26 & 28, "Optical Disk Systems Emerge", R. A. Bartolini et al.
SID 77 Digest, pp. 108-109, "9.3: A 2000-Character Thermally-Addressed Liquid Crystal Projection Display", A. G. Dewey et al.
Physical Review Letters, vol. 32, No. 25, June 24, 1974, pp. 1406-1409, "Volumetric Study of the Nematic-Smectic-A Transition of N—p—Cyanobenzylidene—p—Octyloxyaniline", S. Torza et al.
Le Journal De Physique, Tome 38, Sep. 1977, pp. 1105-1115, less p. 1113, No. 9, "The Parabolic Focal Conic : A New Smectic A Defect", C. S. Rosenblatt et al.
Physical Review A, vol. 14, No. 4, Oct. 1976, pp. 1551-1554, "Pretransitional Mechanical Effects in a Smectic-A Liquid Crystal", N. A. Clark.

Primary Examiner—George G. Stellar
Attorney, Agent, or Firm—Joseph H. Smith

[57] ABSTRACT

An optical erasable liquid crystal disc memory system is provided which includes a rotating liquid crystal information storage medium confined by two surfaces. Various thin films on the surfaces are used to establish the proper conditions within the liquid crystal medium which, in combination with incident radition and applied voltages, accomplish the read, write, and erase functions.

The resulting system provides a locally erasable optical disc memory with high density storage, long-term information stability under a wide range of temperature, and read, write, and erase times compatible with modern high speed computers.

18 Claims, 6 Drawing Figures

LIQUID CRYSTAL DISC MEMORY SYSTEM

BACKGROUND OF THE INVENTION

In recent years, computer systems have exhibited major advances in speed and in miniaturization at significant reduction in cost. Concurrent with these advances have been major efforts to develop information storage and retrieval systems which are also low cost and still compatible with the high speeds with which these new systems operate. Much of this effort has been directed toward the development of optical disc memory devices because of their rapid write time ($>1$ M bit per second), rapid access time ($<0.1$ sec.), high density ($>10^8$ bits per sq. in.), and low cost ($\sim 10^{-4}$ cents per bit). (See Kenney, et al., IEEE Spectrum, pages 33–38, February 1979). To date, numerous types of materials have been developed for optical discs; however, most of these have the disadvantage of storing information permanently; i.e., they cannot be erased or edited. (See R. A. Bartolini, et al., IEEE Spectrum, pages 20–28, August 1978)

Materials which are exceptions to this general rule appear to fall into the following classifications: certain thermoplastics, photochromics, chalcogenides, magnetooptical materials, photoferroelectric materials, photoconductive/electrooptical materials and electrooptic materials. However, each of these has significant disadvantages. For example, thermoplastics such as polyvinylcarbozole/polystyrene require a pre-exposure corona charge. In addition, they use surface relief storage which has a relatively low contrast ratio, a long erase time, difficulties in local erase, and a short lifetime ($\sim 100$ cycles). Photochromics such as spiropyrane typically require blue or ultra-violet light for write and/or erase and hence are not compatible with present semiconductor lasers. Furthermore, most photochromics are subject to fatigue, which severely limits cycle lifetime, and the stored data tends to fade in just a few minutes. Chalcogenides such as TeAsGe typically exhibit a low cycle lifetime ($\sim$cycles) and have a relatively low contrast ratio for erasable media. Magnetooptical materials such as the rate earth iron garnets usually require an external magnetic field. Materials with the largest magnetooptical effects (garnets) require micro-patterning to get high density storage and have high optical insertion loss. Photoferroelectric materials such as $Bi_4Ti_3O_{12}$ require single crystals which are difficult to prepare in large areas. Large area photoferroelectrics can be fabricated as ceramic materials but the ceramics are subject to fatigue. Photoconductive/electrooptic materials such as $Bi_{12}SiO_{20}$ have limited data storage times, on the order of several hours, and also require large single crystals. Electrooptic materials such as $LiNbO_3$ also require single crystals and stored information is erased during readout unless the image is thermally fixed whence another thermal treatment is required for erasure.

The use of liquid crystal materials, particularly smectic liquid crystals is well known in the prior art for certain display devices, and stationary memory systems have been developed which use this media for information storage. (See U.S. Pat. No. 3,796,999 entitled LOCALLY ERASABLE THERMO-OPTIC SMECTIC LIQUID CRYSTAL STORAGE DISPLAYS; and Dewey, et al., SID 77 Digest, 108 (1977).) However, the prior art does not indicate the development of any liquid crystal devices which can function under large accelerations to provide rapid access to data (in a computer disc application, a liquid crystal could experience accelerations exceeding 30,000 m/sec$^2$ depending on the disc size and the desired data rate). The obvious flow-related problems associated with liquids in general suggests that liquid crystals could not be used in optical disc-type memory systems, where large rotational velocities are necessary to achieve the desired data input-output rates. Indeed, rotational velocities exceeding 10,000 rpm may be desirable for some applications.

Furthermore, one approach to information storage in smectic liquid crystals is to create radiation scattering defects in the liquid crystal medium. Such an approach, in light of the specific physical characteristics of defects in these crystals would seem to indicate that in a rotating system, smectic liquid crystals would have severe problems with information stability. For example, it is expected that the cores of defects in smectic liquid crystals structurally approach the isotropic phase and hence have a measurably lower density than the smectic phase ($\sim 0.1\%$, see S. Torza and P. E. Cladis Phys. Rev. Letters, 32(25), 1406 (1974). It would therefore be reasonable to expect significant defect motion or even destruction of the defect (information) pattern in the liquid crystal as a result of centrifugal forces developed at high angular velocities. It would also be reasonable to expect fluid motion to occur during the startup and slowdown phases, further destroying any information-containing defect systems.

Other studies on the structure of defects in homeotropically aligned smectic layers have shown that the information-carrying defects are focal conics which form polygonal arrays spanning the liquid crystal cell (see C. S. Rosenblatt, R. Pindak, N. A. Clark, R. B. Meyer, J. Physique 38(9), 1105(1977)); such arrays could be expected to be quite susceptible to any fluid motion. Furthermore, other literature has shown that cell dilatations of the order of 100 Å are sufficient to cause spontaneous formation of polygonal focal conic defect arrays. (See N. A. Clark, Phys. Rev., A14, 1551 (1976).) With such extreme sensitivity to dilatations, the formation of such polygonal focal conic arrays could be expected to develop at high angular velocities, thereby destroying any information pattern contained in the liquid crystal medium.

For all of these reasons, the use of liquid crystal materials in a rotating data storage system has not heretofore been suggested in the art.

SUMMARY OF THE INVENTION

In accordance with the illustrated preferred embodiments, the present invention provides an optical, erasable, liquid crystal disc memory system. The system includes a storage disc in which two substrates containing the liquid crystal medium, preferably a smectic material, is configured for rotation about an axis. Writing onto the disc is accomplished during rotation by locally heating the liquid crystal with a pulsed, optical beam or array of beams to create radiation scattering defects forming the desired bit pattern.

In some preferred embodiments, several thin films attached to the substrates are used to establish the proper conditions within the liquid crystal medium for achieving the desired small "spot" (or defect) size and for performing erase functions in conjunction with the optical beam.

A system in accordance with the preferred embodiments overcomes many of the objections described in the Background on prior art erasable optical disc memories. It provides a locally erasable disc memory system capable of spot diameters less than 1 micron and stable center-to-center spot spacings of less than 3 microns. (Limitations in this regard are not presently inherent in the liquid crystal system, but are a function of absorbing materials and beam focusing.) Individual data bits can be written and erased with laser pulses on the order of 50 ns at power levels commensurate with high duty cycle semiconductor diode lasers. A temperature storage range of −10° C. to 40° C. is easily achievable with commercially available liquid crystal mixtures, and with special mixtures a much wider range can be achieved. The system has the capability of disc sizes of up to 14 inches and larger, although with these larger sizes some means of flow control such as grooves and internal spacers may be required. Furthermore, despite all previous indications to the contrary, the device has long term spot stability of the order of years, both dynamic and static.

DETAILED DESCRIPTION OF THE INVENTION

Figure 1:
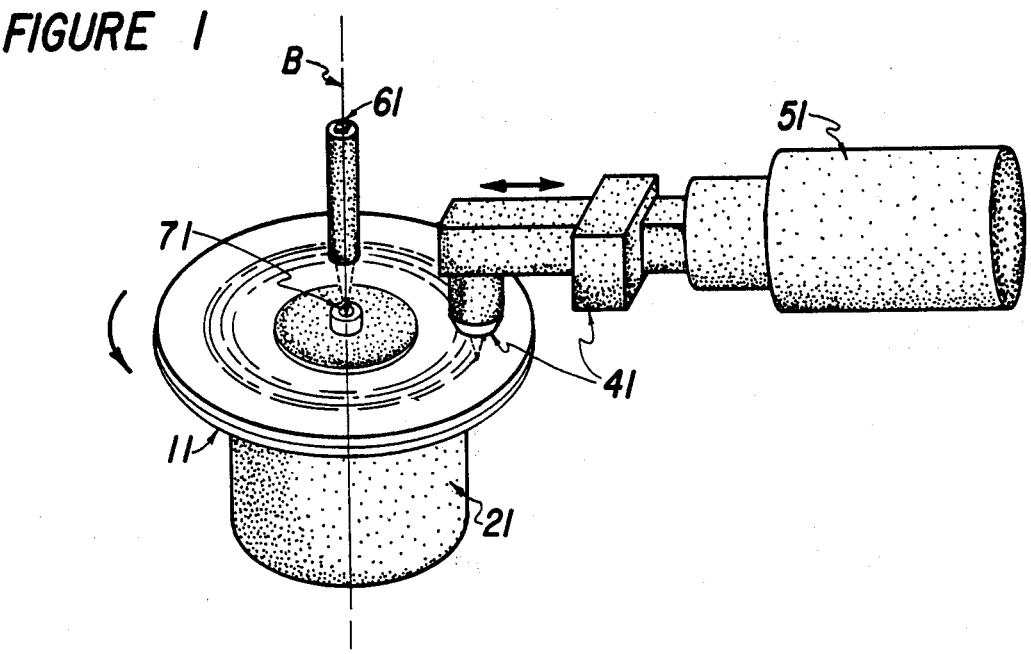
FIG. 1 is a schematic illustration of an optical liquid crystal disc memory system.

Illustrated in FIG. 1 is an optical liquid crystal disc memory system. It includes a liquid crystal disc memory (LCDM) 11 configured for rotation about a central axis B. LCDM 11 typically ranges from 1 in. to 7 in. in radius, and from 1 mm to 13 mm in thickness. The preferred liquid crystal medium used in LCDM 11 is typically smectic in phase. A servo motor and generator 21 are provided to rotate LCDM 11 at a constant rate and to supply appropriate voltages across LCDM 11. Also illustrated are a movable optical system 41 and an optics transducer 51. Optical system 41 converts electrical signals to optical signals and vice versa and is used to write and read onto and off the LCDM 11. Optical system 41 is also used in conjunction with generator 21 to locally erase LCDM 11. Optics translator 51 moves the optical system to the appropriate location on the disc and mediates between the disc and a control device such as digital computer (not shown). Translator 51 also mediates between the control device and optical system 41. A light source 61, e.g., an LED, also interconnected to the control device, and a photodetector 71 are included in order to optically switch the generator 21 when erase functions are required.

Figure 2:
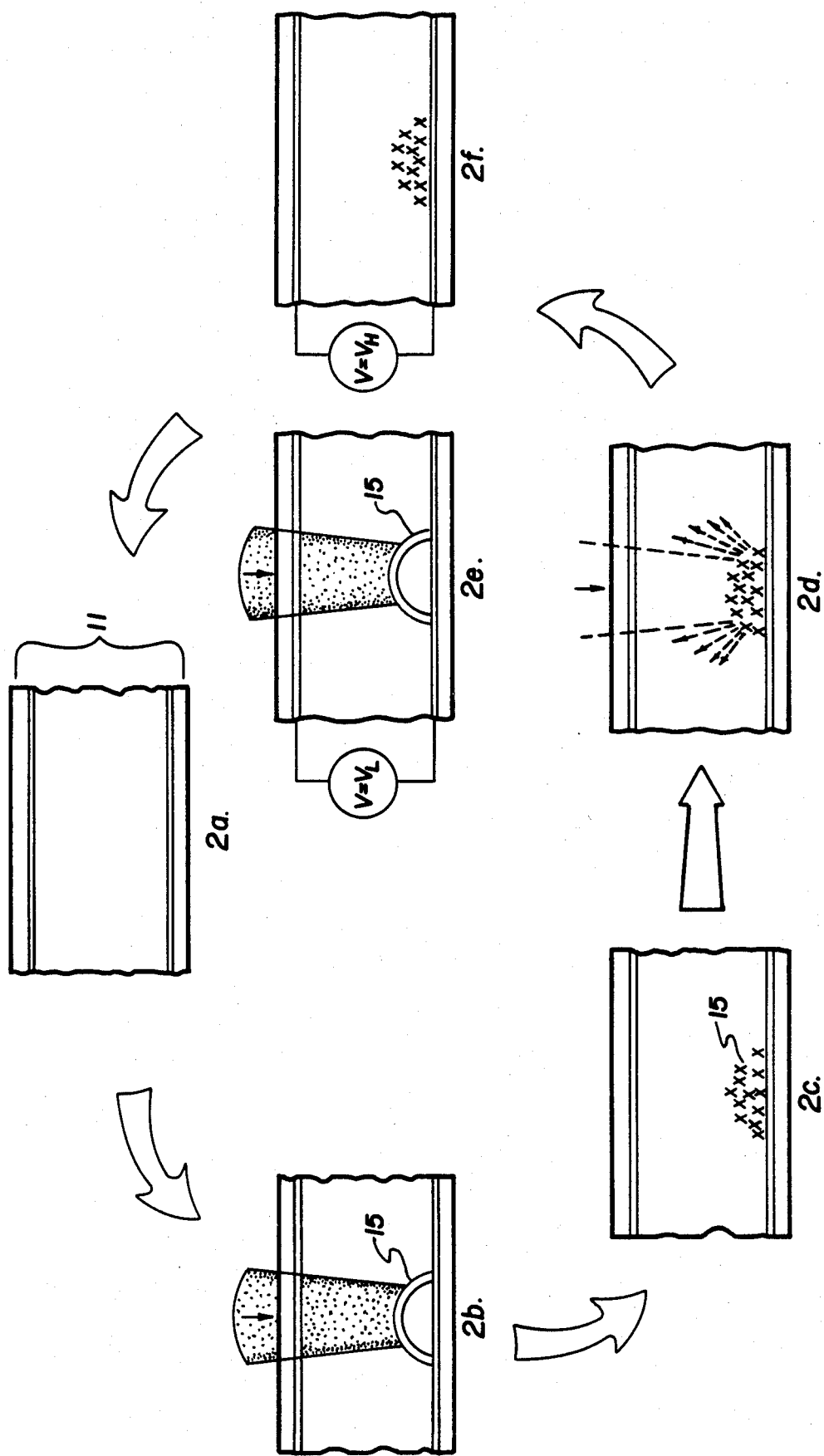
FIG. 2 is a flow sheet depicting the various states of the liquid crystal medium shown by cross-sections of a liquid crystal cell.

In practice, the method for reading, writing and erasing LCDM 11 is well known in the art. As illustrated in FIG. 2a, initial conditions are established wherein LCDM 11 contains a smectic liquid crystal in a non-scattering or unwritten configuration so that it is transparent at the ambient operating temperature. Writing is accomplished by selectively heating small areas of the crystal to the isotropic state typically with a laser, and rapidly cooling back into the smectic state, thereby creating scattering centers 15 in those regions which were locally heated (see FIGS. 2b and 2c). The effect of writing is thus to create a pattern of spots (or bits) on an otherwise non-scattering background. Reading is accomplished by illuminating the liquid crystal (at a much reduced power level relative to the writing function) and observing the scattered radiation to determine the bit pattern (see FIG. 2d). Two kinds of erasing procedures are available, one for local erasure (FIG. 2e), and the other for erasure of the entire disc (FIG. 2f). For local erasure, the local area is heated to the isotropic state and allowed to cool while applying a relatively low voltage (the magnitude being geometry and material dependent). Total erasure of the disc can be accomplished in several ways, all of which are well known in the art; for example, by heating the liquid crystal medium to the isotropic state and allowing it to cool back to the ordered (non-scattering) state in the presence of an electric field, or by subjecting it to a large uniform electric field.

Figure 3:
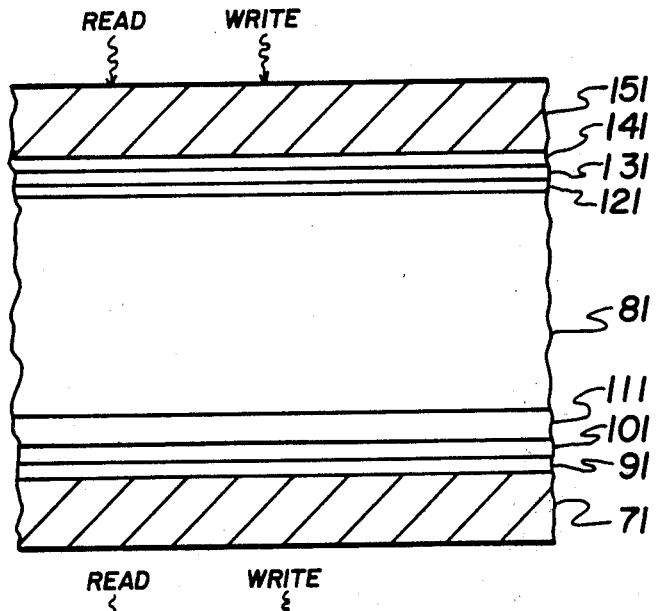
FIG. 3 is a cross-section of a preferred embodiment of the liquid crystal disc.

FIG. 3 shows a cross-section of a preferred embodiment of LCDM 11. In this embodiment, light for both reading and writing functions is incident from above. As shown, LCDM 11 includes two substrates 71 and 151, which together with spacers and sealing material (not shown) contain the liquid crystal medium between the substrates. Clearly, substrate 151 must be transparent to the incident radiation used for reading and for writing. Substrates 71 and 151 are typically of the order 1.5 mm to 2 mm in thickness, but can be thicker or thinner depending on the desired optical quality of the surfaces and mass of the disc. Several suitable materials for the substrates are soda lime glass, polymethyl methacrylate or fused quartz. Many other materials could also be used provided their optical quality is controllable, they are relatively inert with respect to the liquid crystal medium, and they are sturdy enough to support other films and to withstand the forces resulting from rotation. Another aspect of this embodiment is that both substrates need not be made of the same material, e.g., only upper surface 151 need be transparent. The liquid crystal medium (LCM) 81 contained by substrates 71 and 151 is typically smectic, although other phases may also prove stable under rotation. Suitable materials for LCM 81 would be a mixture of alkyl and alkoxy cyanobiphenyls, such as those called "S1" and "S2" available from BHD Chemicals Ltd. In this particular embodiment, LCM 81 is of the order of 10 microns in thickness; in general the minimum thickness of the liquid crystal material is determined by the characteristic size of scattering defects in the medium, its dielectric properties and the limitation of fabrication methods for obtaining uniform thickness and molecular orientation. Clearly, the optimal thickness will vary from one material to the next.

In order to enter information into and retrieve information from the disc, proper conditions must be established within the liquid crystal relative to the writing and reading devices. In the embodiment of FIG. 3, these conditions are established by using several layers of thin films attached to substrates 71 and 151, six such films being shown. Film 111 is an alignment-passivation layer, typically in the range of 50–2000 Å in thickness. Examples of suitable materials for film 111 would be spun-on polyimide or plasma deposited SiO$_2$. The minimum thickness of film 111 is determined by the minimum amount of material required to obtain uniform liquid crystal alignment, while the maximum thickness is typically limited by the requirement of good thermal communication between LCM 81 and film 101. In this particular embodiment, film 111 serves to preferentially align the liquid crystal molecules in a direction parallel to the surface of the film. (In another embodiment, a different direction may be preferred.) This film, being an insulator, also serves to inhibit charge transport between the liquid crystal and the electrode-absorber-reflector layer, film 101; i.e., film 111 also serves a passivation function. In this particular embodiment, film 101, the electrode-absorber-reflector layer, may typically be a glassy metal such as 20% Tungsten, 40% Nickel and 40% Tantalum by weight, although the composition could vary significantly depending on which function, absorber or reflector, is desired to be optimized. Acting as an electrode, film 101 along with transparent electrode 141 serves to provide an electric field across the liquid crystal cell to establish the initial nonscattering state in LCM 81 and to provide the erase functions discussed earlier. As an absorber, film 101 absorbs incident radiation from the writing system, converting it to heat. As a reflector, film 101 reflects incident radition used in the reading system back through the liquid crystal and into the reading optics.

Film 91 is a heat control layer which serves to control the distribution of heat conducted from film 101 to the liquid crystal, relative to the heat conducted from film 101 to the substrate. It also serves to control the heat distribution within the liquid crystal itself. The thickness of the heat control layer ranges from 0.1 μm to 5 μm in this particular embodiment, but could vary more widely depending on the desired heat distribution, the material used for the layer, the power density of the incident radiation, and the desired spot size. Suitable materials for the heat control layer are polyimide, SiO$_2$, or even a metal such as aluminum if it were desired to quickly absorb the heat from film 101 and spread it over a larger area.

Film 121 is an alignment layer for aligning the liquid crystal molecules. Film 121 should be optically transparent and typically 50 Å to 1000 Å in thickness. Suitable materials include silane coupling agents, organic polymer films, and inorganic films such as SiO$_2$. Film 131 is another passivation layer to prevent charge transfer between the liquid crystal and the electrode 141. A typical material for film 131 would be a transparent insulator such as polyimide. Clearly film 131 could also serve as an alignment layer as does film 111, thereby eliminating film 121. However, the use of a separate film 121 illustrates that the chosen alignment directions on the upper and lower surfaces are decoupled and need not be same. Film 141 is a transparent electrode, typically of the order of 1000 Å in thickness, suitable materials including In$_{2-x}$Sn$_x$O$_3$, and Sb doped SnO$_3$.

Figure 4:
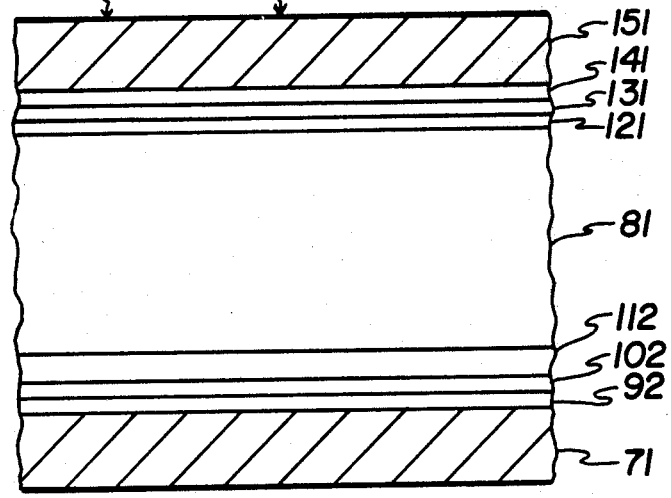
FIG. 4 is a cross-section of another preferred embodiment of the liquid crystal disc.

FIG. 4 illustrates a cross-section of a second embodiment of the liquid crystal disc. In this embodiment, the description and function of elements 71, 81, 121, 131, 141 and 151 are as in the first embodiment depicted by FIG. 3. Again radiation for reading, writing and erasing functions is incident from above. In this second embodiment, film 92 is a heat control layer and an electrode. In addition, it acts in conjunction with reflection control coating 102 as an absorber for the write and erase functions and as a reflector for the read function.

In this embodiment, film 92 may be a metal such as aluminum of approximately 300 Å in thickness, the thickness being determined by the desired heat distribution. In this embodiment as in each of the others, an important consideration in selecting the material for the heat control layer is the desired temperature profile in both space and time within the liquid crystal.

The specifics of the reflection control layer 102 are dependent on the index of refraction of the material used in film 92, the wavelength of the radiation used for the read, write, and erase functions, and the relative absorbance/reflectance desired for the read, write, and erase functions. For an aluminum film 92, a read, write and erase wavelength of 850 nm, and a 50/50 split in absorbed and reflected light, a suitable material for film 102 would be TiO$_2$ approximately 1000 Å thick. Clearly, if another material such as gold were used for film 92, the thickness of film 102 would likewise vary. Also, it may be desirable to use a multilayer reflection control film such as a combination of MgF$_2$ and CeF$_3$, especially if a two wavelength read-write system is contemplated. Film 102 may also be an insulator, and hence serve as a passivation layer as well.

Film 112 is an alignment layer, similar to film 111 of the first embodiment, except that film 112 does not also serve a passivation function. Suitable materials are polyimides or silane coupling agents.

Figure 5:
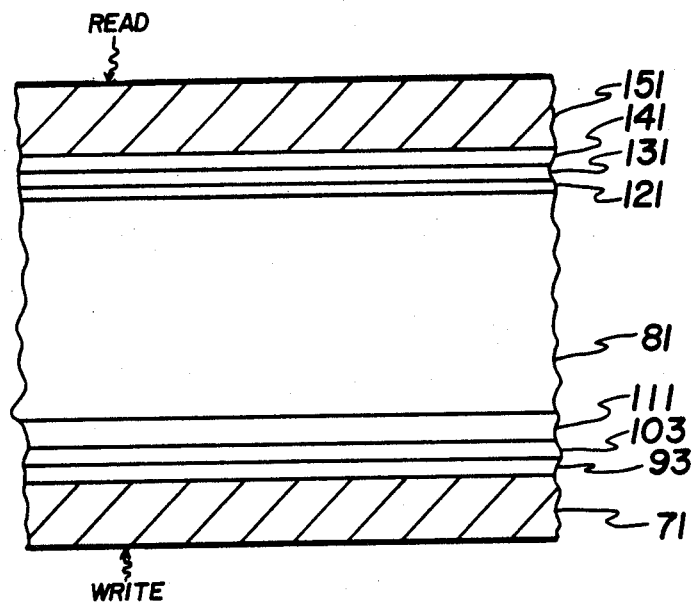
FIG. 5 is a cross-section of yet another preferred embodiment of the liquid crystal disc.

FIG. 5 depicts a cross-section of a third embodiment of the liquid crystal disc which is configured so that radiation for reading is incident from above and radiation for writing and erasing is incident from below. In this embodiment, elements 71, 111, 81, 121, 131, 141, and 151 are as in the first embodiment which is depicted in FIG. 3, except that both substrates 71 and 151 must be transparent. In this third embodiment, film 103 is an electrode, reflector, and absorber, typically a metal such as aluminum of the order of 1000 Å to 2000 Å in thickness. Film 93 is an antireflection coating designed to optimize the absorbtion by film 103 of radiation incident from below. For a glass substrate 71 and film 93 of aluminum with incident radiation at 850 nm, a typical antireflection coating would be a three layer sandwich such as 1030 Å of TiO$_2$, 1550 Å of MgF$_2$, and 875 Å of TiO$_2$.

As can be seen from the above three embodiments of the liquid crystal disc memory, the various films can perform multiple functions. Just as the number of films were reduced by combining several functions into one film, it may also be possible to further reduce the number of films by appropriately doping the liquid crystal medium so that it becomes its own absorber. Additional embodiments will also occur to those skilled in the art.

Figure 6:
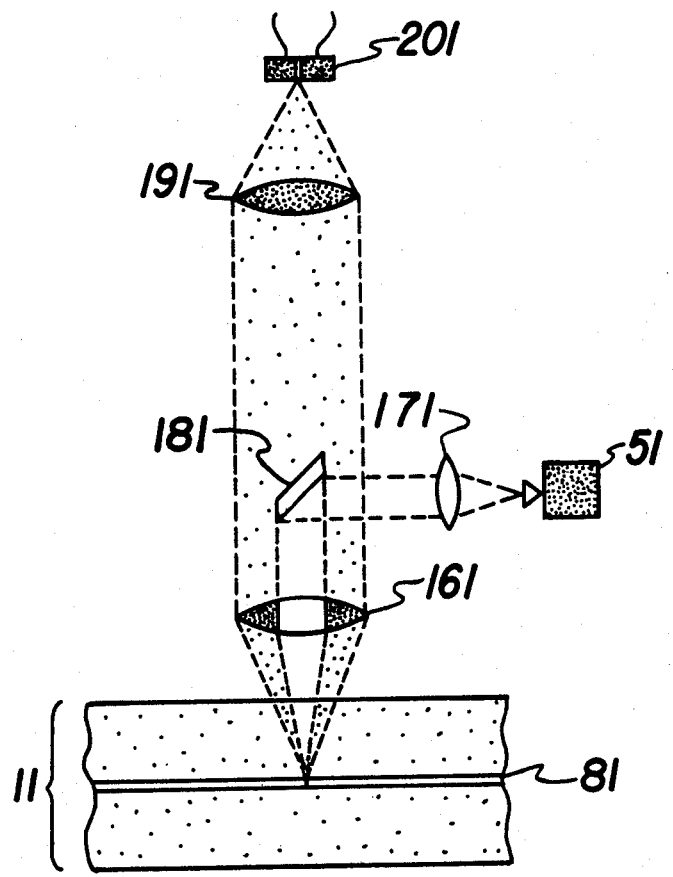
FIG. 6 is a schematic illustration of a typical embodiment of the optical system used to perform read-write-erase functions in an optical liquid crystal disc memory system.

FIG. 6 depicts a typical read-write-erase optical system which can be used with the first and second liquid crystal disc memory embodiments above. The system typically includes a pulsed light source, in this case a semiconductor laser 201, a collimating system 191, a dark field stop/collector mirror 181, focusing optics 161 for focusing the incident beam on the absorber layer of liquid crystal disc memory 11, and imaging optics for imaging the radiation reflected from 181 onto the detector system 51. In practice, this system also includes an automatic focus adjustment intimately related to the optics translator 51 of FIG. 1 to compensate for variations in critical optical distances due to axial run-out, disc warpage, and disc thickness variations. Procedures for such focusing are well known in the art, for example, as described in U.S. Pat. No. 4,051,519 entitled FOCUS CONTROL SYSTEM WITH MOVABLE MIRROR, and in U.S. Pat. No. 4,322,838 entitled DYNAMIC FOCUS ADJUSTMENT FOR TRANSMISSIVE OR REFLECTIVE OPTICAL DISC MEMORY SYSTEM assigned to present assignee, and references described therein.

Clearly, there are innumerable variations in the read-write-erase optical systems depending on the particular focusing and imaging systems, whether separate systems are used for the read and write functions, and whether it is desired to optimize a portion of the system. For example, if it were desired to optimize the writing system, it is likely that an inverted dark field optical system would be used, i.e., the central writing beam would not be blocked as in the above description, and the light scattered out of the central beam direction would be gathered for the reading function. In the third embodiment, it is possible to optimize both the reading and the writing system independently. For example, the reading system would be optimized by using a dark field optical system as described above, with a direct focused beam on the opposite side of the disc for writing and erasing. In this third embodiment, some care is required to insure alignment of the reading and writing systems for proper track identification and following.

While in the preferred embodiments described above, the differences in optical scattering from ordered and disordered textures have been the primary mode for information-storage in the liquid crystal medium, other optical properties could also be applied to this function in a disc memory device, e.g., different optical polarization properties with respect to the polarizations of the incident radiation, differential absorption characteristics, or even luminescence could be utilized. Similarly, the use of patterned layers could also prove beneficial in the context of a liquid crystal disc memory. For example, patterned heat control layers would enable better control of the heat distribution in both space and time. Similarly, patterned electrodes could be used to reduce problems with capacitive reactance, thereby achieving faster switching times, or they could be used to totally erase sectors rather than the entire disc. Patterning might also be used for track following and track identification purposes. Other properties of liquid crystals could also be beneficial; for example, photoconductor addressed liquid crystals could be used to reduce the required laser power for the writing and erasing functions. Furthermore, writing functions should not be restricted to optical systems alone. Other radiation sources entirely, e.g., particle beam devices, may eventually prove beneficial in achieving smaller defect size.

What is claimed is:

1. An information storage and retrieval device comprising:
    a liquid crystal disc memory comprising:
        confinement means for confining a liquid crystal medium, said confinement means configured for rotation about an axis;
        a liquid crystal medium confined by said confinement means, said liquid crystal medium having localized spots therein which act as radiation scattering centers, said spots created by local heating of said liquid crystal medium and representing a desired pattern of information;
    reading means for detecting radiation scattered from individual spots; and
    rotating means for rotating said confinement means and said liquid crystal therein relative to said reading means, said rotation to provide high speed access to said information by said reading means.

2. A device as in claim 1 wherein said liquid crystal medium comprises a smectic liquid crystal.

3. A device as in claim 2 further comprising:
    at least two electrodes on said liquid crystal disc memory for applying an electric field to said liquid crystal medium;
    alignment means for aligning said liquid crystal medium; and
    absorber means in thermal communication with said liquid crystal medium for absorbing a portion of radiation incident on said absorber means and for supplying energy from said radiation to said liquid crystal medium.

4. A device as in claim 3 further comprising reflector means for reflecting a portion of radiation incident thereon.

5. A device as in claim 4 further comprising heat control means for controlling the relative distribution of energy conducted from said absorber means to said liquid crystal medium and from said absorber means to said confinement means.

6. A device as in claim 3 further comprising heat control means for controlling the relative distribution of energy transferred from said absorber means to said confinement means and from said absorber means to said liquid crystal medium.

7. A device as in claim 3 wherein said confinement means further comprises two substrates between which said liquid crystal medium is sandwiched.

8. A device as in claim 7 wherein:
    said electrodes are located opposite each other with said liquid crystal medium therebetween; and
    said alignment means and absorber means are comprised of at least one film located between said substrates.

9. A device as in claim 8 further comprising heat control means for controlling the relative distribution of energy transferred from said absorber means to said liquid crystal medium and from said absorber means to said confinement means.

10. A device as in claim 9 wherein said heat control means comprises at least one film located between said liquid crystal medium and at least one of said substrates.

11. A device as in claim 8 further comprising reflector means for reflecting a portion of radiation incident thereon.

12. A device as in claim 11 wherein said reflector means comprises at least one film located between said liquid crystal medium and at least one of said substrates.

13. A device as in claim 12 further comprising heat control means for controlling the relative distribution of energy transferred from said absorber means to said liquid crystal medium and from said absorber means to said confinement means.

14. A device as in claim 13 wherein said heat control means comprises at least one film located between said liquid crystal medium and at least one of said substrates.

15. A device as in claims 1, 8, 10, or 14 further comprising
    first means for at least one of writing information onto said disc memory and erasing information stored on said disc memory.

16. A device as in claim 15 further comprising writing means for locally irradiating a small area of said liquid crystal medium to create radation scattering defects therein.

17. A device as in claim 15 further comprising selectively erasing means for eliminating individual radiation scattering defects in said liquid crystal medium.

18. A device as in claim 16, further comprising selectively erasing means for eliminating individual radiation scattering defects in said liquid crystal medium.

* * * * *

UNITED STATES PATENT AND TRADEMARK OFFICE
CERTIFICATE OF CORRECTION

PATENT NO. : 4,405,993

DATED : September 20, 1983

INVENTOR(S) : Kahn et al.

It is certified that error appears in the above—identified patent and that said Letters Patent is hereby corrected as shown below:

Column 1, line 41, "(∿cycles)" should read -- (∿10 cycles) --;

Column 1, line 43, "rate" should read -- rare --;

Column 5, line 47, "50 A" should read --50 $\overset{\circ}{A}$ --;

Column 6, line 45, "1030 A" should read -- 1030 $\overset{\circ}{A}$ --;

Column 6, line 45, "1550 A" should read -- 1550 $\overset{\circ}{A}$ --;

Column 6, line 45, "875 A" should read -- 875 $\overset{\circ}{A}$ --;

*Signed and Sealed this*

*Twelfth* Day of *March 1985*

[SEAL]

Attest:

DONALD J. QUIGG

*Attesting Officer*     *Acting Commissioner of Patents and Trademarks*